Jan. 29, 1924.

D. D. CHRISMAN

FAUCET

Filed July 30, 1921

1,481,985

Inventor:
David D. Chrisman,

By Jas. C. Wobensmith
Attorney.

Patented Jan. 29, 1924.

1,481,985

UNITED STATES PATENT OFFICE.

DAVID D. CHRISMAN, OF ELKINS PARK, PENNSYLVANIA.

FAUCET.

Application filed July 30, 1921. Serial No. 488,506.

*To all whom it may concern:*

Be it known that I, DAVID D. CHRISMAN, a citizen of the United States, residing at Elkins Park, in the county of Montgomery and State of Pennsylvania, have invented certain new and useful Improvements in Faucets, of which the following is a specification.

My invention relates to faucets, and it relates more particularly to a faucet which is so constructed and arranged whereby the same may be used as an ordinary permanent faucet, or, by certain manipulation of the parts thereof, to empty or to fill a vessel such as a washtub, washing machine, pail or the like, located some distance from the faucet.

The object of my invention is to provide, in a unitary structure, a faucet which is adapted for use as an ordinary faucet in household plumbing or other piping systems, but which may, when desired, be used for the purpose of emptying or filling a vessel such as a washtub, washing machine, pail or the like, located at a point away from the faucet, and at a lower level than the faucet when occasion requires.

The nature and characteristic features of my invention will be more readily understood from the following description, taken in connection with the accompanying drawings forming part hereof. in which—

Figure 1:
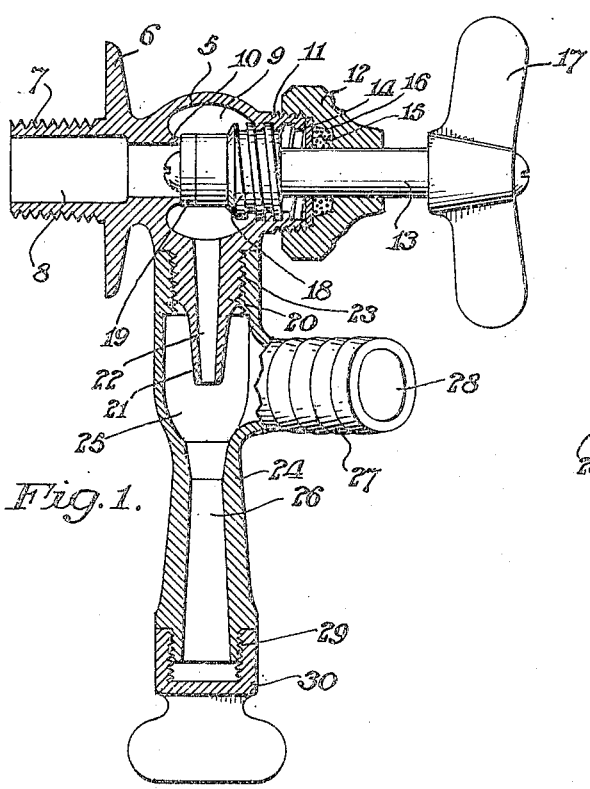
Figure 1 is a vertical central sectional view, partly in elevation, of a faucet embodying the main features of my present invention.

Referring to the drawings, in the particular embodiment of my invention therein shown, the same comprises a valve housing 5 having a flange 6 and a threaded nipple 7, which threaded nipple 7 is provided for the purpose of attaching the faucet to the outlet coupling of the plumbing system in connection with which the faucet is to be used. A passageway 8 extends through the nipple 7 to the interior chamber 9 of the valve housing, and there is provided a valve seat 10 at the inner end of the passageway 8. The outer end of the valve housing 5 is provided with a threaded sleeve 11, upon which threaded sleeve there is mounted a cap member 12 which forms a guide for the valve stem 13 passing therethrough. A washer 14 is clamped on the end of the threaded portion 11 of the valve housing 5, and serves to confine suitable packing 15 in an annular recess 16 in the cap member 12.

The valve stem 13 is provided on its outer end with a handle 17, secured thereto in any suitable manner. The valve stem 13 is also provided with an enlarged portion 18 which is in threaded engagement with internal threads provided in the sleeve 11, and the inner end of the valve stem 13 carries a washer 19 of rubber, fiber, or other suitable material, which is adapted to be seated upon the valve seat 10 to thereby close the inner end of the passageway 8.

The valve housing 5 is provided with a nipple 20, integral with the housing 5, and projecting downwardly from said housing 5. The nipple 20 is provided at its lower end with an outlet nozzle 21, and has a passageway 22 extending from the interior chamber 9 of the valve housing 5 to the end of the outlet nozzle 21. The nipple 20 also has an enlarged threaded portion 23 adjacent the valve housing 5, and upon this threaded portion there is mounted a complementally threaded housing 24, having a central chamber 25 from which downwardly extends an outlet passageway 26, which passageway 26 is arranged in alinement with the nozzle 21 of the nipple 20.

The housing 24 is also provided with a nipple 27 having a passageway 28 communicating with the central chamber 25 of the housing 24, and the exterior surface of the nipple 27 is preferably circumferentially corrugated for the purpose of connecting a suitable hose, not shown, which is adapted to extend to the washtub or other vessel which is to be filled or drained by means of the faucet. It will be noted that the hose connection nipple 27 is arranged at an angle to the axis of the valve housing and the valve member which is mounted therein, this arrangement being provided so that there will be no interference by the hose with the free actuation of the valve handle 17.

The lower end of the housing 24 may be threaded, as at 29, for the reception of a complementally threaded cap member 30, adapted to be mounted thereon for closing the lower end of the passageway 26. In lieu of the employment of the cap member 30, there may be mounted in the lower end of the housing 24 a cock plug 31 adapted to be turned to close the passageway 26 by means of the wing handle 32.

Figure 2:
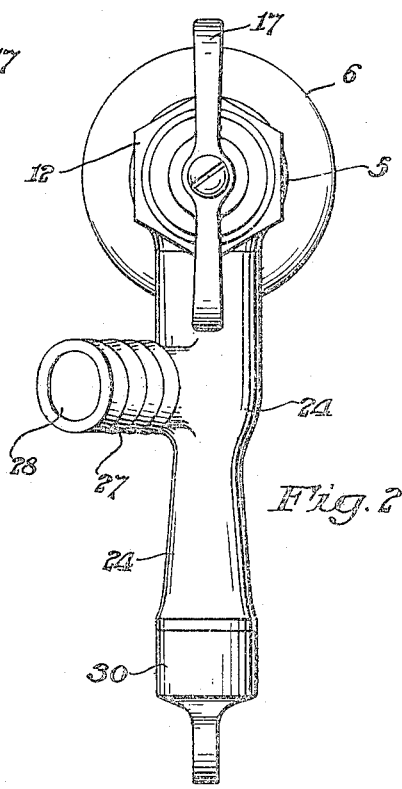
Fig. 2 is a front elevation thereof.

The operation of the device may now be readily understood. When it is desired to use the faucet in the ordinary way, the closure member 30 of Figs. 1 and 2 is removed, or when the lower end of the device is constructed as shown in Fig. 4, the plug 31 is turned so as to bring the opening 33 thereof in alinement with the passageway 26, whereupon, when the valve stem 13 is turned to cause the washer 19 to be retracted from the valve seat 10, by means of the coaction of the enlarged threaded portion 18 with the internal threads of the sleeve 11, the water will be permitted to pass from the supply pipe to which the faucet is connected, through the central chamber, and thence through the passageway 22 in the nipple 21, being projected downwardly and discharged through the passageway 26 at the lower end of the housing member 24.

Figure 3:
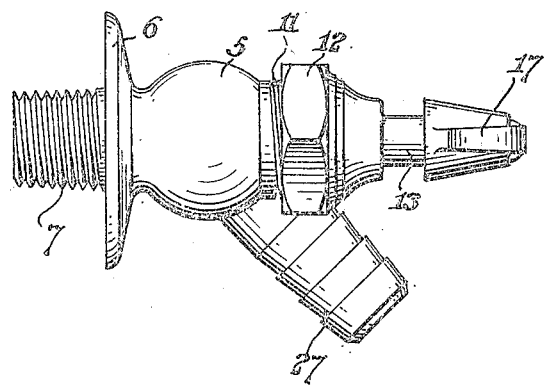
Fig. 3 is a top or plan view thereof.
Figure 4:
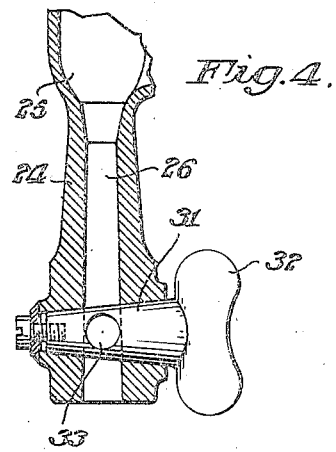
Fig. 4 is a fragmentary sectional view of a modified form of the lower end of the faucet.

When it is desired to use the device for the purpose of filling a vessel such as a washtub, a hose is placed on the nipple 27 and the closure member 30 is threaded upon the lower end of the housing 24, or when the lower end of the device is constructed as shown in Fig. 4, the plug 31 is so turned as to bring the opening 33 thereof at right angles to the axis of the passageway 26, whereupon, when the valve stem 13 is turned to cause the washer 19 to be retracted from the valve seat in the manner before mentioned, the water passing through the nozzle 21 will be caused to pass through the passageway 28 of the nipple 27 and thence through the hose to the vessel to be filled. When it is desired to empty the vessel, the closure member 30 of Figs. 1 and 2 is removed, or the plug 31 of Fig. 3 is turned to bring the opening 33 in alinement with the passageway 26, whereupon the passage of the stream of water from the nozzle 21 will create a suction and ejector action which will cause a reverse flow of the water in the hose which is connected to the nipple 27, and will thereby effectually serve to drain the vessel of the water contained therein, discharging the same, together with the impelling water, through the passageway 26.

It will be seen that there is thus provided, in a unitary structure, a simple and efficient device adapted for use as an ordinary faucet, but which also may be used, by suitable manipulation of certain of the parts thereof, for either filling or draining a vessel located at a distance from the faucet, and even below the level thereof.

Having thus described the nature and characteristic features of my invention, what I claim as new and desire to secure by Letters Patent, is:

1. A faucet comprising a valve housing, a manually operable valve member mounted therein for controlling the passage of liquid to the interior thereof, an integral nipple extending therefrom and terminating in a nozzle at its end, a housing threaded on said nipple having a chamber within which the nozzle of the nipple extends, said housing having a passageway extending from said chamber in alinement with the nozzle, means for closing the end of said passageway, and means for connecting a hose to said housing.

2. A faucet comprising a valve housing, a manually operable valve member mounted therein for controlling the passage of liquid to the interior thereof, an integral nipple extending therefrom and terminating in a nozzle at its end, a housing threaded on said nipple having a chamber within which the nozzle of the nipple extends, said housing having a passageway extending from said chamber in alinement with the nozzle, means for closing the end of said passageway, and a hose connection nipple integral with said housing.

3. A faucet comprising a valve housing, a manually operable valve member mounted therein for controlling the passage of liquid to the interior thereof, an integral nipple extending therefrom and terminating in a nozzle at its end, a housing threaded on said nipple having a chamber within which the nozzle of the nipple extends, said housing having a passageway extending from said chamber in alinement with the nozzle, means for closing the end of said passageway, and a nipple integral with said housing adapted to receive the end of a hose, said nipple having a passageway extending to the central chamber.

In testimony whereof, I have hereunto signed my name.

DAVID D. CHRISMAN.